United States Patent
Hamamoto et al.

(10) Patent No.: US 8,063,320 B2
(45) Date of Patent: Nov. 22, 2011

(54) COUNTING SCALE WITH A MOVING AVERAGE START CALCULATING SECTION, FOR DETERMINING WHETHER OR NOT TO CALCULATE A MOVING AVERAGE

(75) Inventors: Hiroshi Hamamoto, Kyoto (JP); Masahiro Katoh, Kyoto (JP)

(73) Assignee: Shimadzu Corporation, Kyoto (JP)

(*) Notice: Subject to any disclaimer, the term of this patent is extended or adjusted under 35 U.S.C. 154(b) by 355 days.

(21) Appl. No.: 12/441,893

(22) PCT Filed: Sep. 20, 2007

(86) PCT No.: PCT/JP2007/068270
§ 371 (c)(1),
(2), (4) Date: Mar. 18, 2009

(87) PCT Pub. No.: WO2008/041490
PCT Pub. Date: Apr. 10, 2008

(65) Prior Publication Data
US 2010/0065340 A1    Mar. 18, 2010

(30) Foreign Application Priority Data
Sep. 27, 2006    (JP) ................. 2006-262388

(51) Int. Cl.
  *G01G 23/37* (2006.01)
  *G01G 19/42* (2006.01)
(52) U.S. Cl. ............... 177/25.17; 177/25.19; 702/101
(58) Field of Classification Search ............ 73/1.13, 73/1.15; 177/25.13–25.17, 25.19; 702/101, 702/102
See application file for complete search history.

(56) References Cited

U.S. PATENT DOCUMENTS

| | | | | |
|---|---|---|---|---|
| 3,674,097 A * | 7/1972 | Gile | ................. | 177/3 |
| 3,709,309 A * | 1/1973 | Williamset al. | ................. | 177/165 |
| 3,716,706 A * | 2/1973 | Gray | ................. | 702/129 |
| 3,951,221 A * | 4/1976 | Rock | ................. | 177/1 |
| 4,043,412 A * | 8/1977 | Rock | ................. | 177/25.17 |
| 4,063,604 A * | 12/1977 | Rock | ................. | 177/25.15 |
| 4,064,954 A * | 12/1977 | Rock | ................. | 177/25.15 |
| 4,139,070 A * | 2/1979 | Hanson et al. | ................. | 177/200 |
| 4,512,428 A * | 4/1985 | Bullivant | ................. | 177/25.17 |
| 5,635,679 A * | 6/1997 | Kohashi et al. | ................. | 177/25.13 |
| 6,529,810 B2 * | 3/2003 | Foo et al. | ................. | 701/45 |
| 7,395,183 B2 * | 7/2008 | Hamamoto | ................. | 702/173 |
| 7,613,575 B2 * | 11/2009 | Nussbaumer et al. | ................. | 702/41 |
| 7,917,329 B2 * | 3/2011 | Hamamoto | ................. | 702/173 |

FOREIGN PATENT DOCUMENTS

| | | |
|---|---|---|
| EP | 2071304 A1 * | 6/2009 |
| JP | 11-311566 | 11/1999 |
| JP | 2002-236049 | 8/2002 |
| JP | 2006-084192 | 3/2006 |

* cited by examiner

*Primary Examiner* — Randy W Gibson
(74) *Attorney, Agent, or Firm* — J.C. Patents

(57) ABSTRACT

An electronic balance is provided, which adequately exhibits quick response and displaying stability when being used to measure a number of objects. The electronic balance includes a number-of-objects calculating section, for counting a number (Nwa) of objects from the moving average (Wa) and the unit weight (Wu) when the moving average process is being executed and counting a number (Nw) of objects from the load value (W) and the unit weight (Wu) when the moving average process stops; and a display section, for displaying the calculated numbers (Nw, Nwa) of the to-be-measured objects.

3 Claims, 4 Drawing Sheets

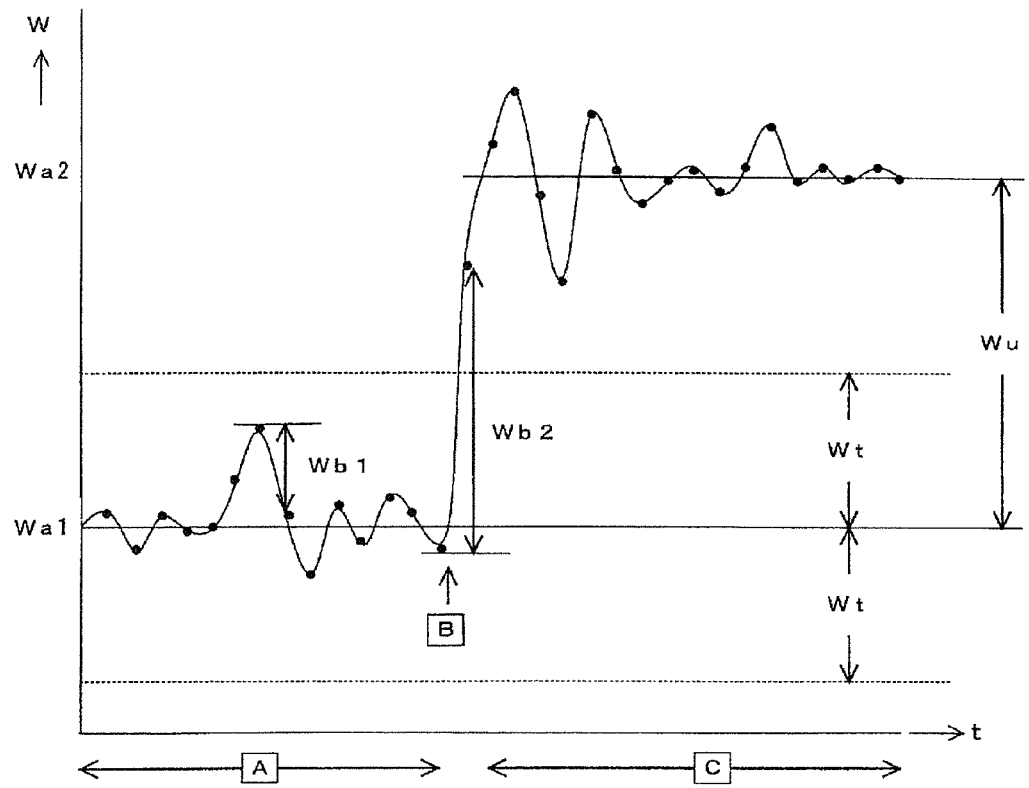
FIG.3
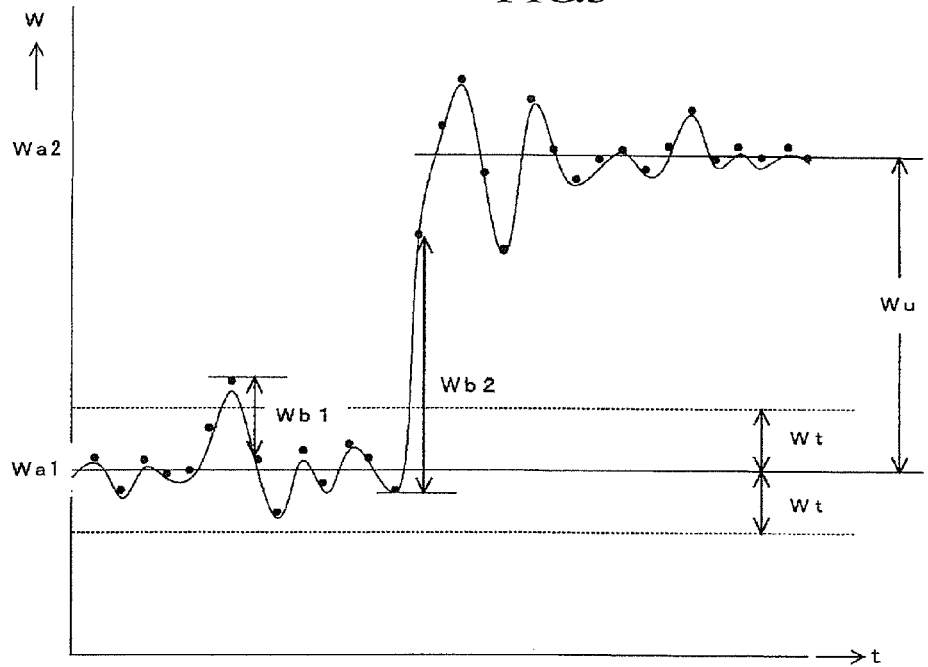
FIG.4(RIOR ART)

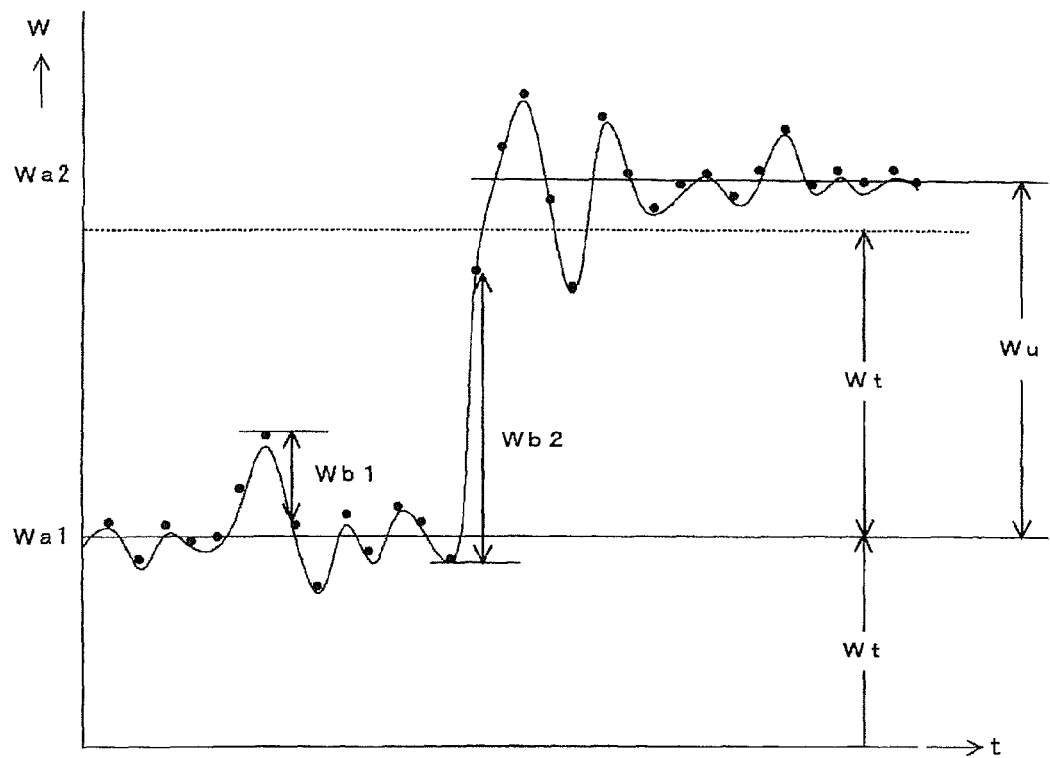
FIG.5(RIOR ART)

COUNTING SCALE WITH A MOVING AVERAGE START CALCULATING SECTION, FOR DETERMINING WHETHER OR NOT TO CALCULATE A MOVING AVERAGE

BACKGROUND OF THE INVENTION

1. Field of the Invention

The present invention generally relates to an electronic balance, in particular, to an electronic balance capable of weighing a desired number of to-be-measured objects by placing the to-be-measured objects with the same mass on a weighing pan.

The abovementioned "electronic balance" mainly refers to an electronic balance with an electromagnetic force balance mechanism, and a load cell type, tuning fork type, capacitance type electronic balance, as well as all the weighing devices for measuring and weighing by using a load weight of a to-be-measured object as an electric signal.

2. Description of Related Art

When an electronic balance is used for measuring an object, the to-be-measured object is placed on a weighing pan, and a weighing value shown in the display is read only after the vibration of the weighing pan caused by placing the object thereon is attenuated and stabilized. However, besides the vibration caused by placing the to-be-measured object on the weighing pan, the weighing pan may also generate continuous vibrations due to the surrounding environment (such as vibration of the base on which the electronic balance is disposed, and airflow change), and such continuous vibrations may not cease completely. If no measure is taken to prevent the vibrations of the electronic balance, when the displayed value is read, the weighing value shown in the display may vary due to the vibrations caused by the surrounding environment. As a result, it is difficult to read the displayed value.

Therefore, for some electronic balances, in order to stabilize the displayed weighing value for being read by a user, a moving average process is executed to calculate an average value of the latest weighing value data and a specified number of previous weighing value data obtained within a fixed period, so as to stabilize the displayed value (with reference to Patent Document 1).

The moving average process is executed to avoid the influences caused by the vibrations of the weighing pan, so as to realize a stable display. Generally, when the specified number of weighing value data maintains stable continuously, a sign (stability sign) for indicating a stable status is shown on the display, and the user can proceed weighing after confirming that the displayed stability sign.

If the moving average process is executed to stabilize the displayed weighing value, the stability of displayed weighing value is indeed improved. However, on the other aspect, the tracking and response capabilities to the load deteriorate. That is, when a dramatic load change occurs on the weighing pan and the moving average process is executed, the moving average process may not only cause noises as a vibration component, but also restrain the variation of the practical load change. Ultimately, the response to the load change slows down.

Therefore, when the moving average process is being executed, a threshold of the load change amplitude is preset as a criterion. Then, whether the moving average process is switched to "stop" or "start" is determined according to a comparison result between the practically produced load change and the preset threshold of the load change amplitude. That is, when the load applied to the weighing pan changes and during the period when the load change is greater than the preset threshold, the moving average process stops. When the load applied to the weighing pan changes and during the period when the load change is smaller than the preset threshold, the moving average process starts.

Furthermore, when the to-be-measured object is in a form of powder or liquid such as medicine, simply weighing a desired weight of the to-be-measured object is sufficient. When a powder object is being weighed, before the load of the powder reaches a target weight, the load of the to-be-measured object is continuously added onto the weighing pan for several times. As the weight on the weighing pan approaches the target weight, the increment of the load gradually reduces each time when the load is added onto the weighing pan. However, if the variation produced by one increment of the load fails to reach the preset threshold of the load change amplitude in the balance, the moving average process maintains, and the response to the added load slows down. Accordingly, some patents have disclosed the following situations. Whether a weighing operation is performed or not according to the threshold of the load change amplitude and a load change rate threshold is determined When the weighing operation is performed in order not to execute the moving average process before the added load gets smaller to improve the response capability, the threshold of the load change amplitude is altered to a small value, and the calculation operations of the moving average process stop before reaching the threshold. Hence, a measurement with a preferred response capability is performed. On the other aspect, if the load change rate is determined to be smaller than the load change rate threshold, and an additional load is not added for the weighing, the threshold of the load change amplitude recovers to a regular value, and the calculation operation of the moving average process is performed to improve the operation efficiency. Hence, the displaying stability is maintained (with reference to Patent Document 2).

Patent Document 1: Japan Patent Publication Gazette No. H11-311566

Patent Document 2: Japan Patent Publication Gazette No. 2006-84192

SUMMARY OF THE INVENTION

An electronic balance may be sometimes applied in "measuring a number of objects". In this case, a weighing procedure thereof includes the following steps.

When a plurality of to-be-measured objects with the same weight is to be measured, a weight of each of the to-be-measured object (hereinafter referred to as a unit weight) is measured in advance, and then the plurality of the to-be-measured objects on the weighing pan is measured according to a relationship between a total weight of the to-be-measured objects placed on the weighing pan and the unit weight. For example, when it is necessary to measure the number of pharmaceutical tablets, or a desired number of semiconductor parts, screws, and bolts of the same type in a plant, the number of the measured objects is measured by means of weighing.

In the case of such number measurement, the contradictory problems about the displaying stability and the response capability to the load change also need to be resolved. In the prior art, a regular moving average process is switched merely by comparing a preset fixed threshold of the load change amplitude with a practically generated load change, which cannot be used to realize the special process for the number measurement.

The number measurement is different from the weighing process of the powder or liquid in that, the added load is not gradually reduced even when the weight of the load approaches a target weight. Each time when the load is added, at least the weight of one to-be-measured object is added, so that the added load is no less than the weight of one to-be-measured object. Therefore, the switching process executed by using a load change amplitude threshold and a load change rate threshold as disclosed in Patent Document 2 is not suitable for being applied in measuring the number of the to-be-measured objects.

Furthermore, in the number measurement, the unit weight differs according to different to-be-measured objects. If the unit weight of the to-be-measured objects is far less than the preset fixed threshold of the load change amplitude in the balance, it is difficult to stop the moving average process even if plenty of to-be-measured objects are added onto the weighing pan, so that the response capability deteriorates. Under this circumstance, the response capability may be improved by reducing the load change amplitude threshold. However, when a small preset threshold is set, the weighing motion may be affected by the vibrations of the weighing pan, so that the displaying stability may deteriorate, and it is difficult for the stability sign to become lightened.

Accordingly, the present invention is directed to an electronic balance, which is capable of executing a moving average process with a desirable result when measuring a number of objects by means of weighing In order to solve the abovementioned problems, in the electronic balance of the present invention, a threshold for determining a start motion and a stop motion of the moving average process is calculated according to a unit weight of the to-be-measured objects, and then the start motion and the stop motion of the moving average process are determined according to the threshold. In view of this, the electronic balance in the present invention includes: a load detecting section, for continuously detecting a total load value (W) of the to-be-measured objects placed on a weighing pan; a moving average process section, for calculating a moving average (Wa) of the detected load value (W); a load change calculating section, for calculating a load change (Wb) of the detected load value (W); a unit weight storage section, for storing a unit weight (Wu), i.e., a mass of each of the to-be-measured object; a moving average start threshold calculating section, for calculating a moving average start threshold (Wt) from the unit weight (Wu), in which the moving average start threshold (Wt) is used as a criterion to determine whether or not a moving average process is executed; a determination section, for determining whether or not the moving average process is executed from the moving average start threshold (Wt) and the load change (Wb); a number-of-objects calculating section, for counting a number (Nwa) of the to-be-measured objects from the moving average (Wa) and the unit weight (Wu) when the moving average process is being executed and counting a number (Nw) of the to-be-measured objects from the load value (W) and the unit weight (Wu) when the moving average process stops; and a display section, for displaying the calculated numbers (Nw, Nwa) of the to-be-measured objects.

Herein, the "load change (Wb)" refers to any variation that can be used as an index for indicating a load stability. Particularly, a difference between a latest load value data and a current load value data or a load change amplitude in each unit time (a difference between a maximum load value data and a minimum load value data in each unit time) may also be used as the load change (Wb).

The unit weight (Wu) of the to-be-measured objects may be stored in the unit weight storage section by weighing the to-be-measured objects directly through the electronic balance. Alternatively, when the unit weight of the detected objects is known in advance, the data about the unit weight may also be set through input without performing the weighing motion.

The "moving average start threshold (Wt)" is set with a physical parameter corresponding to the "load change (Wb)", in which a difference between a latest load and a current load or a load change amplitude in each unit time may be used as the moving average start threshold (Wt).

According to the present invention, the mass of each of the to-be-measured object, i.e., the unit weight (Wu), is stored in the unit weight storage section, so that the moving average start threshold calculating section calculates the moving average start threshold (Wt) from the unit weight (Wu), in which the moving average start threshold (Wt) is used as a criterion to determine whether or not the moving average process is executed.

Specifically, a weight of 20%-80% of the unit weight (Wu) is, for example, set as the moving average start threshold (Wt). After the moving average start threshold (Wt) is set, if a plurality of the to-be-measured objects is placed on the weighing pan, the load detecting section continuously detects the total load value (W) of the to-be-measured objects placed on the weighing pan. The load change calculating section calculates the load change (Wb) of the detected load value (W). The load change is used as an index for indicating whether the current load is stable or not. Then, the determination section determines whether or not the moving average process is executed according to the load change (Wb) at this time and the moving average start threshold (Wt) used as the criterion. The moving average start threshold (Wt) is a value calculated according to the unit weight. A load additionally added onto the weighing pan is an integral multiple of the unit weight (Wu) and varies in a quantificational manner (stage by stage). Therefore, if the threshold (Wt) is appropriately set (e.g., 20%-80% of Wu), when one to-be-measured object is additionally added onto the weighing pan, it surely becomes a load exceeding the threshold (Wt), so that it is determined that the moving average process does not need to be executed.

When it is determined to execute the moving average process, the moving average process section calculates the moving average (Wa) of the detected load value (W). Moreover, when the moving average process is executed according to a determined result made by the determination section, the number-of-objects calculating section counts a number (Nwa) of the to-be-measured objects according to the moving average (Wa) and the unit weight (Wu). In addition, when the moving average process stops according to a determined result of the determination section, the number-of-objects calculating section counts a number (Nw) of the to-be-measured objects according to the load value (W) and the unit weight (Wu). The display section displays the calculated numbers (Nw, Nwa) of the to-be-measured objects.

Effects of the Invention

According to the electronic balance in the present invention, whether or not the moving average process is executed is determined according to the threshold (Wt) set based on the unit weight. Thus, regardless of the value for the unit weight of the to-be-measured objects, when one to-be-measured object is additionally added onto the weighing pan, it surely exceeds the threshold (Wt). Therefore, the moving average process practically stops when the to-be-measured object is added, and the displaying function with a better response capability to the load is provided. Furthermore, when the load is below the threshold (Wt), the influence from the surrounding environment is determined, and the displaying stability may be ensured. In this way, the application of the electronic balance for measuring the number of objects can be improved.

Solution and Effects for Solving Other Problems

In the present invention, the moving average start threshold calculating section may use a weight of 20%-80% of the unit weight as the moving average start threshold. By setting the moving average start threshold (Wt) in such a range, the influence caused by a vibration can be eliminated, and the moving average process practically stops as long as one to-be-measured object is added; hence, whether the load change is due to the vibration or by the added load can be determined accurately. In addition, when at least one to-be-measured object is added, the moving average process definitely stops for a temporarily period. Once the number of the added objects is changed, the weighing with a preferred response capability is achieved.

In the present invention, a unit weight calculating section may be further set to calculate the unit weight according to the total load value (W) of the to-be-measured objects placed on the weighing pan and number-of-objects information (N) of the to-be-measured objects placed on the weighing pan.

Based on the above, even for to-be-measured objects with an unknown unit weight, the load thereof can be practically measured by placing a pre-known number of the detected objects on the weighing pan, so as to calculate the unit weight thereof.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic view of a measurement example according to the present invention.

FIG. 4 is a schematic view of a measurement example in the prior art.

FIG. 5 is a schematic view of a measurement example in the prior art.

DESCRIPTION OF THE EMBODIMENTS

Figure 1:
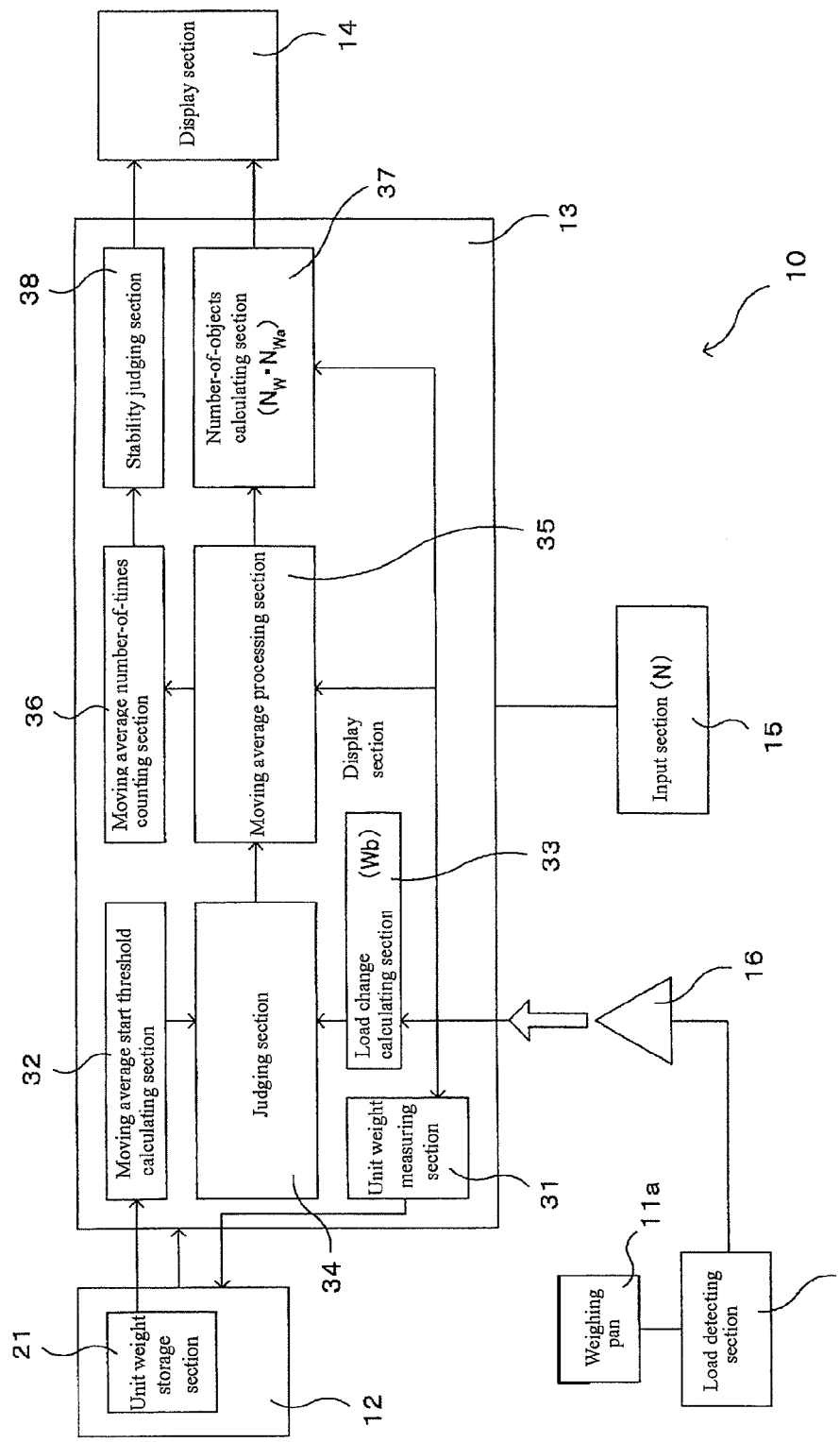
FIG. 1 is a block diagram of a structure of an electronic balance according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Hereinafter, the implementation of the present invention is illustrated with reference to the accompanying drawings. In addition, the following embodiment is merely taken as an example, and thus may be amended without departing from the scope of the spirits of the present invention.

Figure 2:
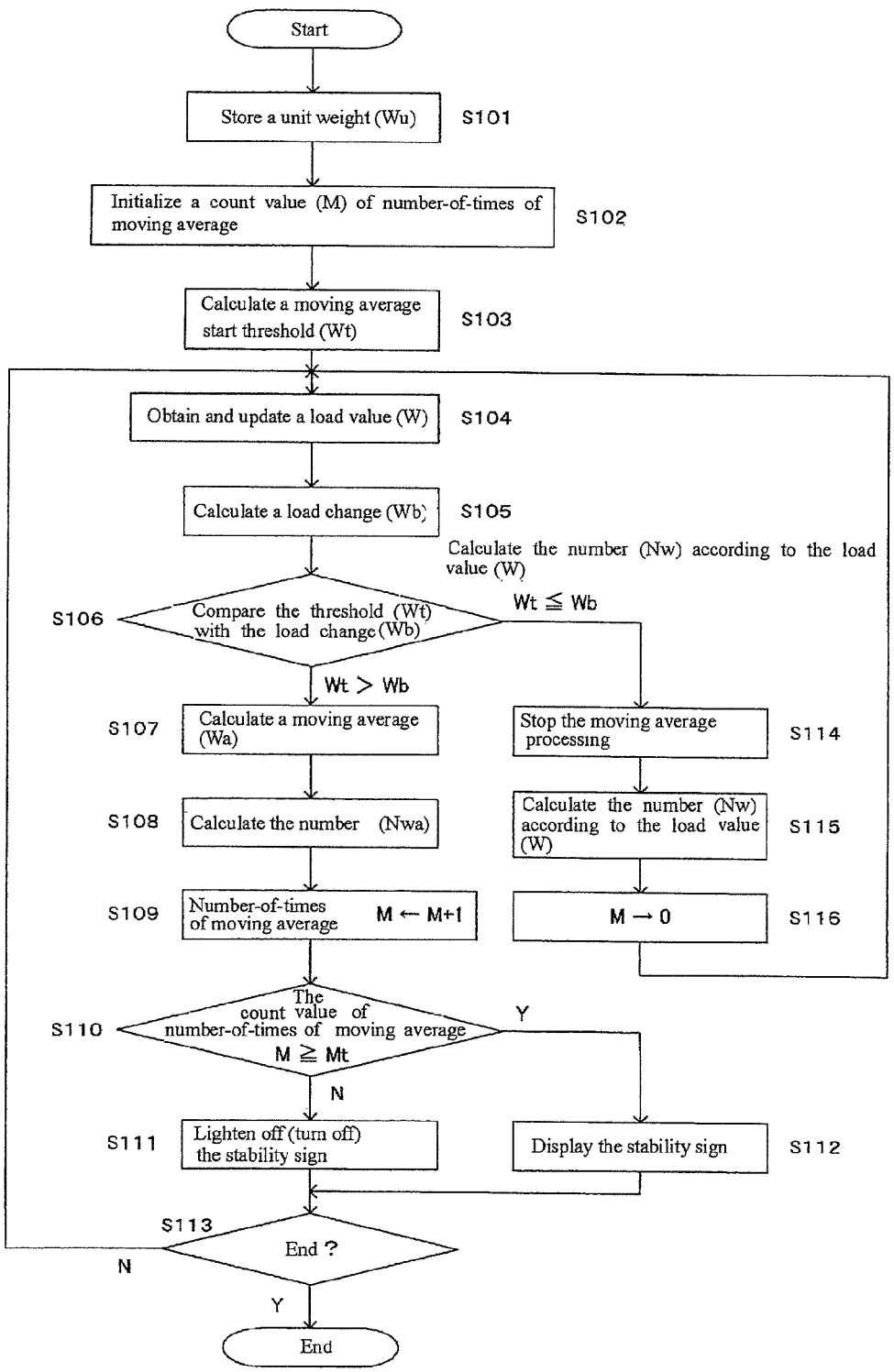
FIG. 2 is a flow chart for measuring a load by the electronic balance in FIG. 1.

FIG. 1 is a block diagram of a structure of an electronic balance according to an embodiment of the present invention. FIG. 2 is a flow chart of an operation of the electronic balance in FIG. 1. The electronic balance 10 mainly includes a load detecting section 11 for continuously detecting a load of a to-be-measured object placed on a weighing pan 11a, a storage section 12 for storing the desired data, a control section 13 for controlling the electronic balance, a display section 14 constituted with a liquid crystal panel for displaying a weighing result and a message for informing the user, and an input section 15, such as a ten-key.

The load detecting section 11 may be any well-known mechanism such as an electromagnetic force balance type, or load cell type electronic balance mechanism and weighing mechanism, which continuously measures the load of the to-be-measured object placed on the weighing pan and outputs the load as a signal repeatedly. The signal detected by the load detecting section 11, i.e., a load value data (W), is digitalized through an analog/digital (A/D) converter 16, and then sent to the control section 13.

The storage section 12 is constituted with storage elements such as a read only memory (ROM) or a random-access memory (RAM). In the storage section 12, a unit weight storage section 21 related to the present invention is configured for storing a weight of each of the objects, i.e., a unit weight Wu. The unit weight Wu may be a value calculated according to the load value detected by the load detecting section 11 when the to-be-measured objects are actually placed on the weighing pan 11a, or a value directly input from the input section 15 and stored when the mass of one to-be-measured object is already known. Furthermore, the storage section 12 temporarily stores various setting values and weighing values required in the calculating process (such as a moving average start threshold Wt, a plurality of load values $W_0, W_1, W_2, \ldots$ used for the moving average processing, a number of the load values used for the moving average processing, a count value M of number-of-times of moving average).

The control section 13 is constituted by a so-called computer (central processing unit, CPU) for executing various control operations. The control section 13 may be further divided based on the functions thereof in the control operations related to the present invention into different functional blocks, including a unit weight measuring section 31, a moving average start threshold calculating section 32, a load change calculating section 33, a judging section 34, a moving average processing section 35, a moving average number-of-times counting section 36, a number-of-objects calculating section 37, and a stability judging section 38.

The unit weight measuring section 31 performs the following control motions of calculating the unit weight according to the load of the detected objects placed on the weighing pan and number-of-objects information input from the input section 15, and storing the unit weight in the unit weight storage section 21. Specifically, the message for informing the user to place the to-be-measured objects and inputting the number of the objects is displayed in the display section 14. After the user places the to-be-measured objects and inputs the number N of objects according to the message, a calculation of the load/number of objects is executed to obtain the unit weight.

The moving average start threshold calculating section 32 calculates the moving average start threshold Wt according to the unit weight Wu stored in the unit weight storage section 21.

Specifically, the threshold Wt is calculated based on the following Equation (1):

$$Wt = K \cdot Wu \quad (1)$$

in which K is a coefficient in a range of $0.2 \leq K \leq 0.8$.

The coefficient K is an appropriate setting value input according to a magnitude of the vibrations caused by the surrounding environment, and the magnitude and unevenness of the unit weight for the to-be-measured objects. For example, when encountering large vibrations, K may be set to a high value for maintaining the moving average process easily. Moreover, if the unit weight of the to-be-measured objects is high, even a small K can easily maintain the moving average process. Moreover, if a large difference exists between the weights of the to-be-measured objects, K may be set to a low value; thus, the moving average process may stop easily when adding an object lighter than the standard to-be-measured object onto the weighing pan. In addition, when K is set below 0.2, the weighing is not easily affected by the vibration (shown in FIG. 4). Moreover, when K is set above 0.8, the moving average process may not stop when the to-be-measured object is added onto the weighing pan, so that a high speed response cannot be realized (show in FIG. 5). Generally, it is preferred e setting K=0.4 or so.

The load change calculating section 33 calculates a data variation sent from the load detecting section 11 every second. The variation is calculated by means of, for example, calculating a difference between a maximum load and a minimum load among a plurality of measurement points in each unit time. Herein, a difference $\Delta W$ between the latest load data $W_1$ and the current load data $W_0$ is calculated to serve as the load change Wb.

The determination section 34 determines whether or not the moving average process is executed according to the load change Wb and the moving average start threshold Wt. That is, when Wt>Wb, the moving average process is executed (maintained), and when Wt☐Wb, the moving average process stops.

The moving average process section 35 calculates a moving average Wa of the detected load value W. That is, a number-of-times of moving average m is set in advance, and an average of at most n latest values is calculated by processing the current detected load value $W_0$, the latest load value $W_1$, and the second latest load value $W_2$, .... Moreover, during a period right after the average process stops, the average process is executed on less than n latest values in this period since the number of the latest values is less than n.

The moving average number-of-times counting section 36 counts the number-of-times M of moving average used in the moving average process. The number-of-times M of moving average is used to determine whether or not a stable status is maintained. That is, the stable status is determined by comparing the number-of-times M of moving average with a preset standard number of times Mt.

The number-of-objects calculating section 37 calculates a number Nwa of objects by using the moving average Wa calculated by the moving average process section 35 and the unit weight Wu, and calculates a number Nw of objects by using the detected load W, i.e., $W_0$, and the unit weight Wu when the moving average process is stopped but the moving average is not output. That is, any one of Wa/Wu (=Nwa) and $W_0$/Wu (=Nw) is calculated, and then the result is turned into an integer by means of a round-off process. Furthermore, a process is executed to display the calculation result in the display section 14.

The stability determination section 38 evaluates the stability by comparing the preset standard number of times Mt as a criterion of the stability with the current number-of-times M of moving average. If the current number-of-times M of moving average exceeds the preset number of times Mt, it would be determined by the stability determination section 38 as being a stable status, and a stability sign is displayed in the display section 14.

Then, the process operations for measuring the number of objects in the present invention are illustrated with reference to the flow chart in FIG. 2.

First, a unit weight Wu is stored in advance (S101). When the unit weight Wu Of the to-be-determined objects is known, the value thereof is input via the input section 15. When the unit weight Wu of the to-be-determined objects is unknown, in order to improve the accuracy of measuring the unit weight through an averaging process, the unit weight Wu is calculated by placing N (a plurality of) to-be-determined objects on the weighing pan 11a, and inputting the number N of the objects, so as to calculate the unit weight Wu for being stored in the unit weight storage section 21.

Next, in order to initialize a count value M of number-of-times of moving average for determining the stable status, M is set as 0 (S102).

Then, a moving average start threshold Wt is calculated from the unit weight Wu (S103). The moving average start threshold Wt is a criterion for determining whether or not the moving average process is executed (maintained). More specifically, a value of 0.4×Wu is set as the threshold Wt.

Afterwards, the plurality of the to-be-determined objects are placed on the Weighing pan, and a total load value W of the to-be-determined objects is obtained and is temporarily stored as a current load value $W_0$. Although the current load value $W_0$ does not exist in an initial measurement, when a previously detected load value W is stored as $W_0$, a current load value W is stored as $W_1$, and a new load value W is updated as $W_0$. Likewise, when a previous value is stored as $W_1$, the value is also stored as $W_2$. Likewise, the load $W_i$ is updated as $W_{i+1}$, the value stored as $W_{n-2}$ is now stored as $W_{n-1}$. The number of the stored load values is set at most to be n (the maximum number of load values for calculating the moving average), so that the previous value stored as $W_{n-1}$ is dropped (S104).

Then, a difference $\Delta W$ between the latest load value $W_1$ and the current load value $W_0$ is calculated to serve as a load change Wb for being stored temporarily (S105).

Afterwards, in order to determine whether the moving average process is Executed (maintained) or stopped, the moving average start threshold Wt is compared with the load change Wb. When Wt>Wb, it is determined that the load change is caused by vibration and no load is added, so that S107 is executed; and when Wt☐Wb, it is determined that a load is added, and S114 (S106) is executed.

In S106, when it is determined that no load is added, a moving average Wa is calculated (S107).

At the initial measurement, merely $W_0$ is provided, so that $W_0$ is used as the moving average. However, when $W_1$, $W_2$, ... $W_i$ are stored, an average value of the i (n at most) values is calculated to serve as the moving average.

According to the calculated moving average Wa and the unit weight Wu, the Number Nwa of objects is calculated and displayed in the display section 14 (S108).

Then, the count value M of the number-of-times of moving average is added by 1 (S109).

Then, whether the count value M of the number-of-times of moving average Reaches the preset standard number of times Mt is determined If the preset standard number of times Mt has not been reached, it is determined that the stability sign should not be displayed, and the stability sign of the display section 14 is not lightened (turned off). Otherwise, the stability sign should be displayed, and the stability sign is not lightened—(S110, S111, and S112).

After the abovementioned operations, the display section 14 displays the current moving average Wa, and displays the stability sign at a stable status.

Then, it is determined whether the user inputs to end the measurement or not (S113), and if not, the process returns to S104 for executing the same operations; otherwise, the measurement ends.

On the other hand, if it is determined that a load is added in S106, the moving average process is not executed, and the ongoing moving average process stops (S114).

When the previously stored load values $W_0, W_1, \ldots$ exist, the load values are deleted.

Then, the current load W is temporarily stored as a new load $W_0$ directly (the Moving average process is not executed), and a number Nw of objects is calculated according to the load W and the unit weight Wu (S115).

At this time, the previous load values are deleted, and the moving average process stops, so that the displaying function with a better response capability to the load change is performed.

Afterwards, since the moving average process has stopped, a count value M of the number-of-times of moving average is reset as 0 (S116). Then, the process returns to S104 for performing the same operations.

According to the abovementioned processes, regardless of the magnitude of the unit weight Wu of the to-be-measured objects, if no to-be-measured objects are added to the load, the moving average process is executed (maintained), and if the load is added, the moving average process practically stops.

FIG. 3 is a schematic view of an example of a measurement when the electronic balance performs the operations in FIG. 2 according to the present invention. In an interval A shown in FIG. 3, the number of the to-be-measured objects placed on the weighing pan is fixed, but the load W keeps changing under the influence of the surrounding environment. The moving average Wa in the interval A is indicated by Wa1. Moreover, the difference between two neighbouring load values is indicated as the load change Wb. Even if a slightly large load change Wb1 due to vibrations exists in the interval A, it may not exceed the threshold Wt. Therefore, the moving average process is continuously executed and maintained.

At the point B, one to-be-measured object is added onto the weighing pan 11a. At this time, a load change Wb2 instantly exceeds the threshold Wt, so that the moving average process stops. At this time, the current load W, instead of the moving average Wa, is used to calculate the number of objects, so as to achieve a high speed response to the added load.

Furthermore, FIGS. 4 and 5 are schematic views of measurements easily achieved when a preset threshold irrelevant to the value to be measured is used in the prior art.

FIG. 4 shows a situation when the threshold is excessively small. Even if no load is added, a slightly large load change Wb1 may be generated, so as to stop the moving average process. Under this circumstance, the stable status is hard to achieve.

FIG. 5 shows a situation when the threshold is excessively large. When no load is added, the slightly large load change Wb1 may not leads to any affect. However, when sometimes the load change Wb2 due to the adding load is below the threshold, the moving average process does not stop, and the high speed response cannot be achieved.

Although the situations have been described above, the following situations may also exist: at first, 10 the to-be-measured objects are used to calculate the unit weight, then the number of to-be-measured objects, and finally, 30 the to-be-measured objects are used to calculate the unit weight and so forth Then, the unit weight with a higher accuracy is calculated by repeating the weighing process. Under this circumstance, the calculated unit weight may be updated to a new unit weight, but preferably, at each time when the unit weight is updated, the threshold is also updated according to the updated unit weight.

Furthermore, when the unit weight of one to-be-measured object is excessively small, the difference between the effect caused by the adding loads and that caused by the vibrations cannot be identified. In this case, the unit weight may be set by taking two or three to-be-measured objects as a whole, and the load may be added at a unit of two or three to-be-measured objects as a whole to distinguish vibrations and the adding of a load.

INDUSTRIAL APPLICABILITY

The present invention can be applied in manufacturing electronic balances capable of executing the moving average processing with a preferred usability when measuring the number of objects.

What is claimed is:

1. An electronic balance, comprising:
   a load detecting section, for continuously detecting a total load value (W) of a plurality of to-be-measured objects placed on a weighing pan;
   a moving average processing section, for calculating a moving average (Wa) of the detected load value (W);
   a load change calculating section, for calculating a load change (Wb) of the detected load value (W);
   a unit weight storage section, for storing a unit weight (Wu), which is a mass of each of the to-be-measured objects;
   a moving average start threshold calculating section, for calculating a moving average start threshold (Wt) from the unit weight (Wu), wherein the moving average start threshold (Wt) is used as a criterion to determine whether or not a moving average process is executed;
   a determination section, for determining from the moving average start threshold (Wt) and the load change (Wb) on whether or not the moving average process is executed;
   a number-of-objects calculating section, for counting a number (Nwa) of the to-be-measured objects from the moving average (Wa) and the unit weight (Wu) when the moving average process is being executed, and counting a number (Nw) of the to-be-measured objects from the load value (W) and the unit weight (Wu) when the moving average process stops; and
   a display section, for displaying the calculated numbers ($N_w$, Nwa) of the to-be-measured objects.

2. The electronic balance according to claim 1, wherein the moving average start threshold calculating section uses a weight of 20%-80% of the unit weight as the moving average start threshold.

3. The electronic balance according to claim 1, further comprising: a unit weight calculating section, for calculating the unit weight from the total load value (W) of the to-be-measured objects placed on the weighing pan and number-of-objects information (N) of the to-be-measured objects placed on the weighing pan.

* * * * *